(12) United States Patent
Benderradji et al.

(10) Patent No.: US 12,025,025 B2
(45) Date of Patent: Jul. 2, 2024

(54) TURBINE ENGINE ROTOR ELEMENT ASSEMBLY EQUIPPED WITH A SEALING DEVICE

(71) Applicant: SAFRAN AIRCRAFT ENGINES, Paris (FR)

(72) Inventors: Kamel Benderradji, Moissy-cramayel (FR); Delphine Hermance Maxime Parent, Moissy-cramayel (FR); Pauline Anne Freche, Moissy-cramayel (FR); Joel Robert Mathieu, Moissy-Cramayel (FR); Laurent Jablonski, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/252,280

(22) PCT Filed: Nov. 17, 2021

(86) PCT No.: PCT/FR2021/052025
§ 371 (c)(1),
(2) Date: May 9, 2023

(87) PCT Pub. No.: WO2022/106779
PCT Pub. Date: May 27, 2022

(65) Prior Publication Data
US 2023/0407749 A1 Dec. 21, 2023

(30) Foreign Application Priority Data
Nov. 20, 2020 (FR) ..................................... 2011933

(51) Int. Cl.
*F01D 5/06* (2006.01)
*F01D 5/02* (2006.01)
*F01D 11/00* (2006.01)

(52) U.S. Cl.
CPC ............. *F01D 5/066* (2013.01); *F01D 5/026* (2013.01); *F01D 11/001* (2013.01); *F05D 2240/24* (2013.01); *F05D 2240/55* (2013.01)

(58) Field of Classification Search
CPC ........ F01D 5/066; F01D 5/026; F01D 11/001; F05D 2240/24; F05D 2240/55
See application file for complete search history.

(56) References Cited

U.S. PATENT DOCUMENTS

| 4,123,199 A | * | 10/1978 | Shimizu | ................. | F01D 5/066 |
| | | | | | 416/198 A |
| 5,350,278 A | * | 9/1994 | Burge | ..................... | F01D 5/066 |
| | | | | | 416/198 A |

(Continued)

FOREIGN PATENT DOCUMENTS

| FR | 3077327 A1 | 8/2019 |
| WO | 2005/052321 A1 | 6/2005 |

OTHER PUBLICATIONS

International Search Report received for PCT Patent Application No. PCT/FR2021/052025, mailed on Feb. 23, 2022, 5 pages (2 pages of English Translation and 3 pages of Original Document).

*Primary Examiner* — Hoang M Nguyen
(74) *Attorney, Agent, or Firm* — WOMBLE BOND DICKINSON (US) LLP (57) ABSTRACT

A turbine engine assembly including a first rotor element and a second rotor element extending around a longitudinal axis X and coupled to one another by a gear coupling, the first rotor element including teeth and the second rotor element including complementary teeth which extend along the longitudinal axis and form the gear coupling. The first and second rotor elements each include a first and a second radial flange which are annular and arranged facing one (Continued)

another, and the assembly includes a sealing device configured to ensure that the gear coupling is sealed at the first and second flanges.

15 Claims, 4 Drawing Sheets

(56) References Cited

U.S. PATENT DOCUMENTS

| | | | | |
|---|---|---|---|---|
| 10,598,096 | B2* | 3/2020 | Hugon | F01D 5/08 |
| 2002/0187046 | A1* | 12/2002 | Beutin | F01D 11/008 |
| | | | | 416/223 R |
| 2011/0027103 | A1* | 2/2011 | Philippot | F01D 5/3015 |
| | | | | 416/97 R |
| 2021/0054743 | A1 | 2/2021 | Blanchard et al. | |

* cited by examiner

TURBINE ENGINE ROTOR ELEMENT ASSEMBLY EQUIPPED WITH A SEALING DEVICE

FIELD OF THE INVENTION

The present invention relates to a turbine engine assembly comprising rotor elements which are coupled by a toothed coupling of the curvic coupling type. It also concerns a turbine engine comprising such an assembly and a method for mounting such an assembly.

TECHNICAL BACKGROUND

The prior art comprises the document FR-A1-3077327 which describes rotor elements connected to each other by a bolted connection to ensure the torque transmission between them. This document provides an annulus having radial sealing elements and an anti-rotation system of this annulus with respect to one of the rotor elements. The anti-rotation system comprises radial teeth provided on the rotor element and axial pins carried by the annulus. However, this assembly is not entirely satisfactory.

It is known to couple two rotor elements extending around a longitudinal axis by means of a toothed coupling. The first element comprises a series of axial teeth which engage with another series of complementary teeth of the second element so as to form the toothed coupling.

This type of coupling is known as "curvic coupling" or dog connection. Such a coupling on the one hand, allows to facilitate the assembly between the first and the second elements and on the other hand, ensures that the first and second elements are precisely centred and positioned in relation to each other. This toothed coupling also allows for the transmission of torque through the rotating assembly as well as relative axial and radial displacements between the first and second elements.

Clearances may occur in operation and/or be due to the configuration of the teeth at the level of their summits and the bottoms of the adjacent hollows of the corresponding teeth. These clearances can create a risk of fluid leakage such as air circulating radially inside and/or outside the toothed coupling.

The air flowing through the coupling could cause thermal expansion or contraction of the first and second elements and thus reduce the service life. Similarly, the air leakages from members where the air has undergone a compression involves a loss of energy and impacts on the turbine engine efficiency.

It is therefore necessary to address these risks of leakage at the level of the coupling.

The purpose of the present invention is to provide a simple, effective and economical solution for preventing the fluid circulation to either side of the toothed coupling of a rotor assembly of a turbine engine.

SUMMARY OF THE INVENTION

This is achieved in accordance with the invention by means of a turbine engine assembly comprising a first rotor element and a second rotor element which extend about a longitudinal axis X and which are coupled to each other by means of a toothed coupling, the first rotor element comprising teeth and the second rotor element comprising complementary teeth which extend along the longitudinal axis and which form the toothed coupling, wherein the first rotor element and the second rotor element respectively comprising a first radial flange and a second radial flange which are annular and which are arranged opposite each other, the assembly comprising a sealing device configured so as to ensure a sealing of the toothed coupling at the level of the first and second flanges.

Thus, this solution allows to achieve the above-mentioned objective. In particular, the sealing device is configured so as to rest at least partly on a segment of one of the flanges and in the path of the fluid leakages so that the flowing of a fluid such as air either outside or inside the toothed coupling is prevented. The teeth, which allows for the proper transmission of the torque between the two rotor elements, has an improved service life. This also improves the performance of the turbine engine.

The assembly also comprises one or more of the following characteristics, taken alone or in combination:

- an attachment device configured so as to hold the sealing device and the first and second flanges firmly together.
- the first flange and the second flange each extend radially inwards from the toothed coupling.
- the first flange comprises a groove open to a first surface thereof and the sealing device is intended to be housed at least partly within the groove.
- the sealing device comprises an annular corrugated sheet-metal.
- the sealing device comprises an annular shield intended to cover at least partly free ends of the first and second flanges.
- the shield comprises a general U-shape, the shield comprising a longitudinal segment, a first branch and a second branch.
- the shield comprises a plurality of annulus sectors, each extending along a circumferential direction.
- the attachment device comprises a threaded rod intended to pass through at least one orifice passing through the first flange and one hole passing through the second flange, the attachment device further comprising tightening means for mounting on the threaded rod so as to make it secured to at least one of the first and second flanges.
- the first branch and the second branch comprise a plurality of slits which are intended to be passed through by the threaded rod, the first branch and the second branch comprising bearing areas each resting on a second surface of the first flange and of the second flange respectively.
- the first flange and the second flange each extend radially outwards from the toothed coupling.
- the annular sheet-metal is split.
- the sealing device is mounted between the flanges.
- the sealing device is mounted outside the flanges.

The invention relates to a turbine engine comprising at least one turbine engine assembly having any of the foregoing characteristics.

The invention also relates to an aircraft comprising at least one turbine engine as mentioned above.

The invention further relates to a method for mounting a turbine engine assembly as aforesaid, the method comprising:
- a step of providing the sealing device, and
- a step of placing the sealing device at the level of the first and second radial flanges to impede a fluid circulation through the toothed coupling.

The method also comprises one or more of the following characteristics or steps, taken alone or in combination:

a step of mounting the attachment device to the first flange and the second flange so as to hold the sealing device and the first and second flanges firmly together.

the step of placing the sealing device comprises a sub-step of placing the sealing device in the groove of the first flange.

the step of placing the sealing device comprises a sub-step of placing the sealing device around the first and second radial flanges so as to cover at least the free ends of the first and second flanges.

the step of placing the sealing device comprises a sub-step consisting in engaging or nesting the annulus sectors with each other to form the annular shield.

the step of mounting the attachment device comprises:
- a sub-step of inserting the threaded rod into the through hole of the second flange,
- a sub-step of tightening the threaded rod on the second flange,
- a sub-step of inserting the threaded rod mounted on the second flange into the through orifice of the first flange so that the second flange faces the groove,
- a sub-step of tightening the threaded rod on the first flange so that the flanges are secured to each other.

the mounting step of the attachment device comprises:
- a sub-step of inserting the threaded rod into the slits of the first and second branches of the shield and into the through orifices and holes of the first and second flanges,
- a sub-step of tightening the threaded rod on the first and second flanges so that the flanges are secured to each other.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
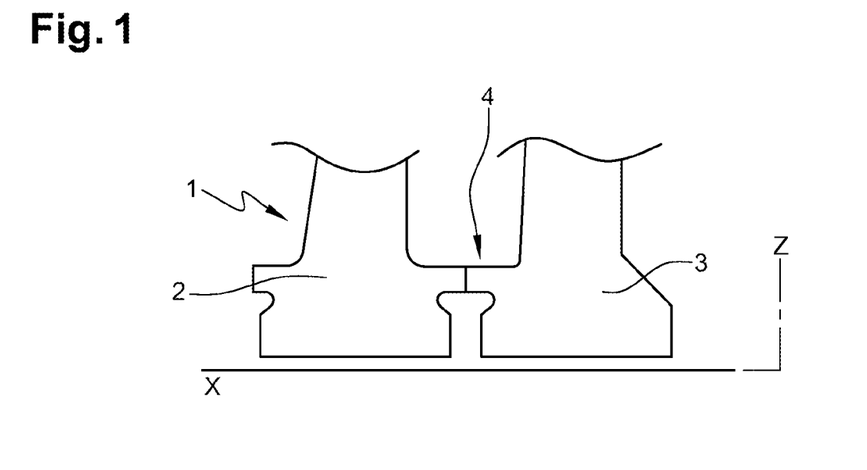
FIG. 1 is a schematic, partial and axial cross-sectional view of an example of two rotor elements of a turbine engine that are coupled together by a coupling according to the invention.

FIG. 1 shows a turbine engine assembly 1 comprising a first rotor element 2 and a second rotor element 3, each extending around a longitudinal axis X of the turbine engine. The first rotor element 2 and the second rotor element 3 are coupled to each other by means of a toothed coupling 4 of the "curvic coupling" type.

These first rotor elements 2, 3 are for example a first disc and a second disc of a high pressure compressor of the turbine engine, these discs rotating around the longitudinal axis X. Of course, these two rotor elements may be two turbine engine shafts, such as a fan shaft and a turbine shaft.

The turbine engines generally comprise various pipelines or orifices allowing for circulating fluids such as air to ventilate and/or pressurise members of the turbine engine (bearing lubrication enclosure) or oil to cool and/or lubricate other members of the turbine engine (guide bearing). The air may come from the primary air flow circulating through the low pressure compressor. In the case of a turbofan engine (not shown), this typically comprises a fan generating an airflow which divides, at the level of a splitter nose, into a primary flow and into a secondary airflow. The primary flow passes from upstream to downstream through a low-pressure compressor, a high-pressure compressor, a combustion chamber, a high-pressure turbine and a low-pressure turbine (not shown). These members, through which the primary flow passes, form the gas generator of the turbine engine. The secondary flow circulates radially outside the gas generator.

In the present description, the terms "upstream", "downstream", "axial" and "axially" are defined with respect to the flow of gases in the turbine engine and here along the longitudinal axis X. Similarly, the terms "radial", "radially", "internal" and "external" are defined with respect to a radial axis Z perpendicular to the longitudinal axis X and with respect to the distance from the longitudinal axis X.

Figure 2:
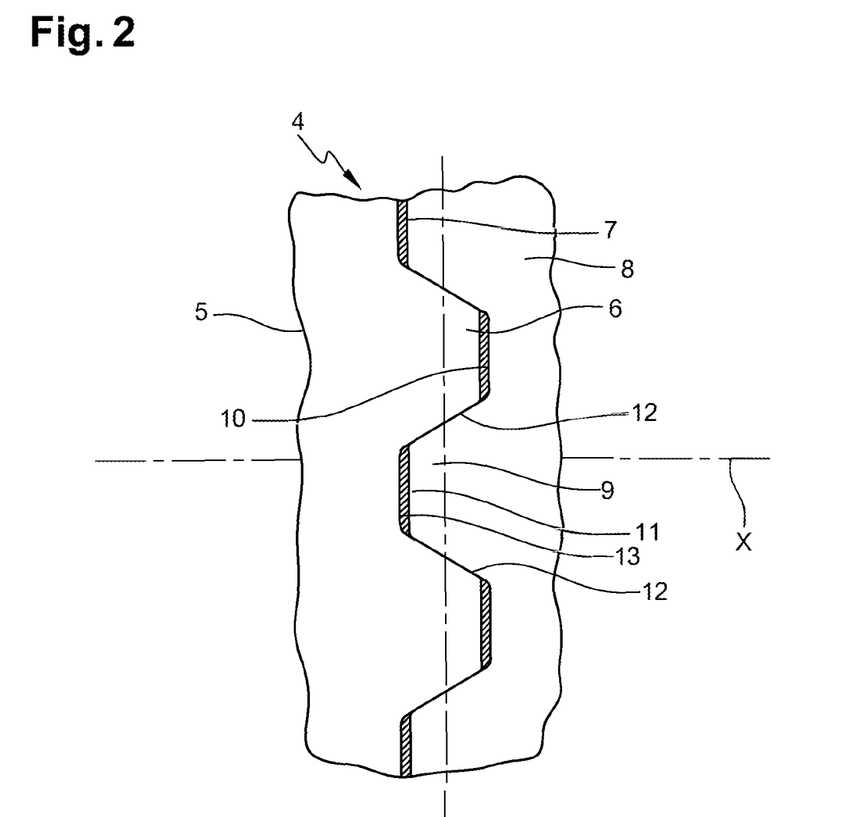
FIG. 2 shows an example of a toothed coupling between the two rotor elements of a turbine engine according to the invention.

With reference to FIG. 2, the first rotor element 2 comprises a first cylindrical shell 5 which extends axially. The shell 5 comprises a first annular series of teeth 6 at its free (here downstream) end. Each tooth 6 extends axially. The teeth 6 are evenly spaced around the longitudinal axis and hollows 7 are formed between adjacent teeth 6 in a circumferential direction.

The second rotor element 3 comprises a second cylindrical shell 8 which also extends axially. The second cylindrical shell 8 comprises at its free end (here upstream) a second annular series of complementary teeth 9 which are complementary to those of the first element 2. The complementary teeth 9 extend axially. As with the teeth of the first element 2, the complementary teeth 9 are evenly spaced and between each pair of adjacent complementary teeth, along the circumferential direction, a complementary hollow 10 is formed. In this example, the shells 5, 8 are facing each other. These also have approximately the same diameter.

The teeth 6 and the complementary teeth 9 are oriented towards each other (in axial but opposite directions).

The teeth 6 of the first element 2 are intended to engage in the complementary hollows 10 of the second element 3 and the complementary teeth 9 of the second element 3 are intended to engage in the hollows 7 of the first element 2. This forms a toothed coupling or "curvic coupling" between the first and second elements 2, 3. This toothed coupling 4 allows the transmission of torque between the first and the second elements 2, 3.

Each tooth 6 or complementary tooth 9 comprises a summit 11 which is connected to two lateral faces 12. The two lateral faces 12 are opposite each other in the circumferential direction. The teeth and complementary teeth 6, 9 each also comprise two longitudinal faces opposite each other along the radial axis and each axially extending the surface of the respective shells 5, 8. The hollows 7 and complementary hollows 10 comprise a bottom connected to the lateral faces of the teeth 6 and complementary teeth 9 respectively. Advantageously, the faces 12 are flat. Advantageously, each tooth 6 or complementary tooth 9 has a trapezoidal shape.

In FIG. 2, the summits 11 of each complementary tooth/ teeth 6, 9 face a bottom 13 of a hollow/complementary hollow 7, 10 respectively. However, here, the summit 11 is not in contact with, or resting on, the bottom of the hollows, which may generate a circulation of fluid, particularly air. Indeed, in the case of compressor rotor discs, the air can circulate radially from the outside to the inside of the discs. In this case, the hot air coming from the primary duct passing through the compressor and circulating inwards the discs can lead to a loss of efficiency in the turbine engine. The air leakage is due on the one hand to the clearances between the first and second rotor elements during the mounting and on the other hand to the small displacements between the teeth. Conversely, air can circulate through the interior of the discs and pass radially through the toothed coupling 4 outwards towards the vanes carried by the discs.

Figure 3:
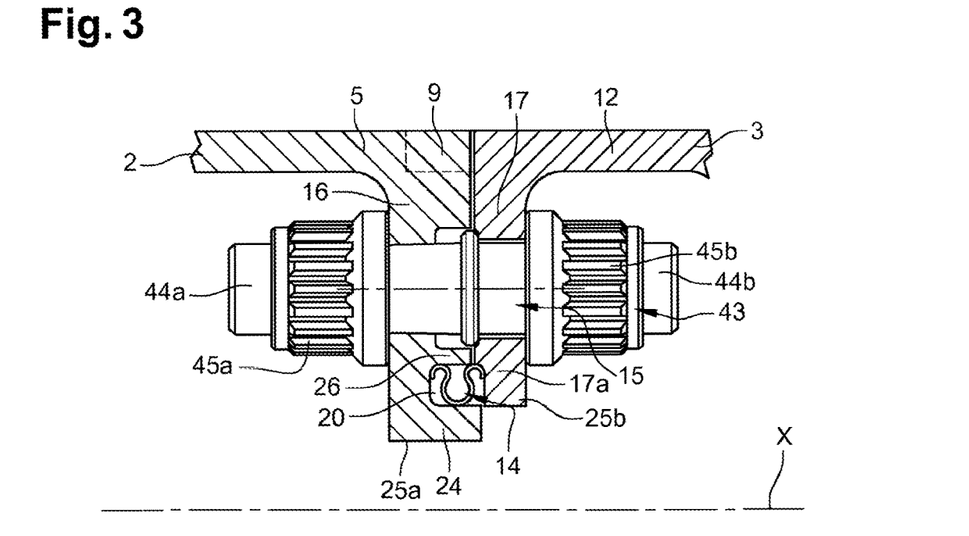
FIG. 3 shows a turbine engine assembly equipped with a sealing device and an attachment device for attachment between two radial flanges of the rotor elements according to the invention.

FIG. 3 shows a sealing device 14 which is configured to impede the circulation of fluid through the toothed coupling 4. This sealing device 14 cooperates with radial flanges which equip the first and second rotor elements 2, 3.

The radial flanges are attached to each other by an attachment device 15, which is intended to hold the sealing device 14 in position in an optimal manner. The attachment device 15 also allows the assembly to be tightened and attached so that the sealing device 14 is effectively held in position.

In particular, the first element 2 comprises a first annular flange 16 which extends from the first shell 5 radially, here inwardly. The first flange 16 is also annular and centred on the longitudinal axis X. The second element 3 also comprises a second annular flange 17 which extends radially, here also inwardly. Alternatively, the first and second flanges 16, 17 extend radially outwards from the first and second shells 5, 6 respectively. The first and second flanges 16, 17 face each other with a gap or clearance between them.

Figure 6:
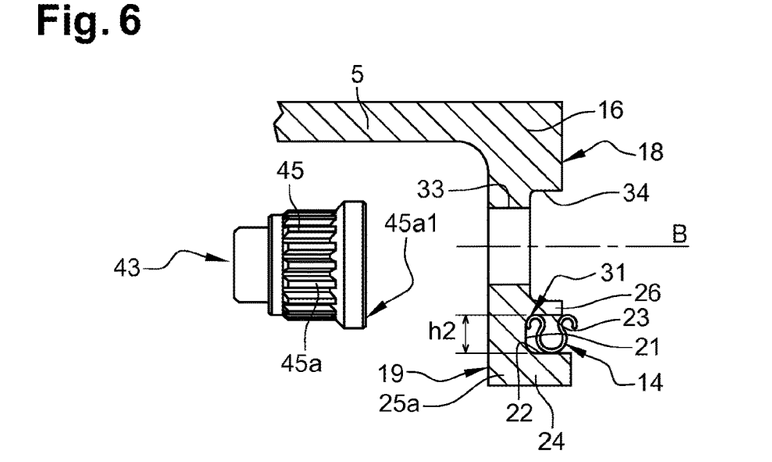
FIG. 6 shows a first flange of a first rotor element and an example of a tightening member intended to cooperate with the attachment member of the previous figure according to the invention.

In FIGS. 3 and 6, the first flange 16 comprises a first surface 18 and a second surface 19 which are opposite along the longitudinal axis X. The first flange 16 comprises an annular groove 20 which is intended to receive, at least partly, the sealing device 14. The groove 20 has a U-shaped cross-section and is arranged in the first surface 18 of the first flange 16. Specifically, the groove 20 is open on the first surface 18. This is coaxial with the longitudinal axis X. The groove 20 further comprises a bottom 21 from which a first wall 22 and a second wall 23 extending along the longitudinal axis and opposite each other (here along the radial axis). The first wall 22 is carried by an axial lug 24 (formed by a shoulder) which is formed at the free end 25a of the first flange 16. In other words, the first radial flange 16 is generally L-shaped in axial cross-section. The axial lug 24 radially faces a rib 26 which extends along the longitudinal axis. The rib 26 carries the second wall 23 of the groove 20. In this example, the axial lug 24 has a length that is greater than that of the rib 26 along the longitudinal axis X.

Figure 4A:
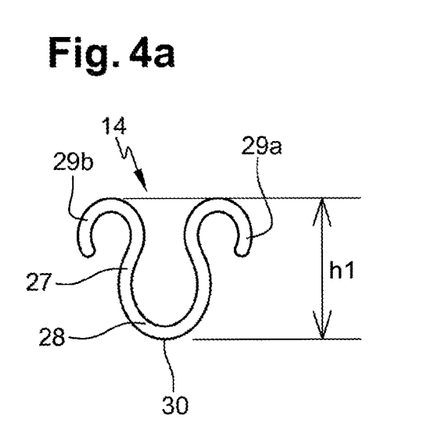
FIG. 4a illustrates, in cross-section, a sealing member, of the sealing device, which has a corrugated shape according to the invention.
Figure 4B:
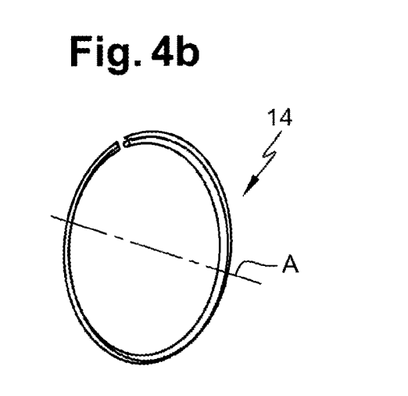
FIG. 4b illustrates, in perspective view, the sealing member of the previous figure according to the invention.

With reference to FIGS. 3, 4a and 4b, the sealing device 14 is formed by a sheet-metal 27 which is annular (360°) with axis A. However, the sheet-metal 27 is split to facilitate its mounting. The sheet-metal 27 is intended to be housed in the groove 20. This sheet-metal 27 is corrugated. This has a roughly Ω-shaped cross-section (capital omega). The sheet-metal 27 is arranged radially between the axial lug 24 and the rib 26. In the present example, the sheet-metal 27 comprises an annular main body 28 having two circumferential ends facing each other. The sheet-metal 27 also comprises two soleplates (referred to as first soleplate 29a and second soleplate 29b) curved on either side of the body 28 (along the axis A). The body 28 has a summit 30 which is intended to rest on the first wall 22 of the groove 20. The first soleplate 29a is intended to rest at least partly on a first support surface 31. The latter is arranged between the rib 26 and the bottom 21 of the groove 20. The first support surface 31 is in particular a chamfer which has a radius of curvature complementary to that of the first soleplate 29a. The sheet-metal 27 has a height h1 (see FIG. 4a) which is approximately equal to the height h2 (see FIG. 6) of the groove 20. The height h1 is measured between the summit 30 and a plane tangent to the extreme points of the soleplates 29a, 29b.

Figure 5:
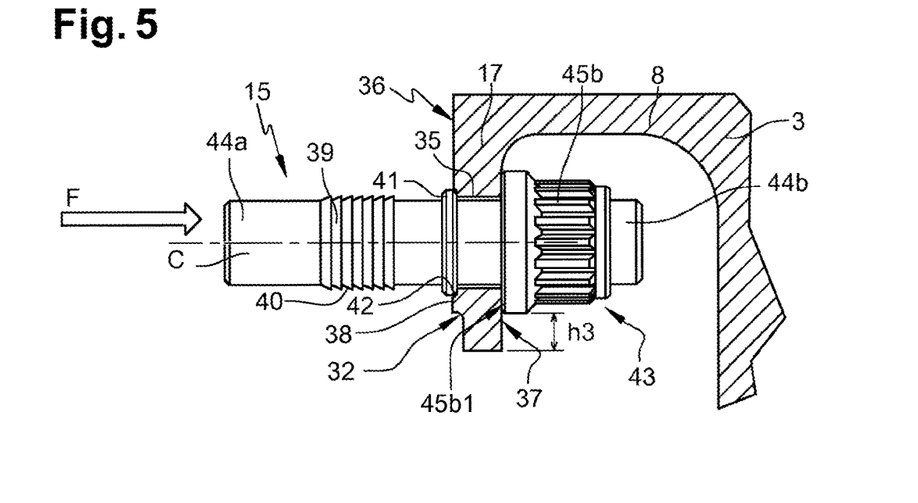
FIG. 5 shows a second flange of a second rotor element on which an attachment member is mounted according to the invention.

The second soleplate 29b is intended to be supported against a second annular support surface 32 of the second flange 17 which is visible in FIG. 5. A segment of the flange and the second support surface 32 are intended to close the groove 20 to trap and hold the sheet-metal 27 within it. On the other hand, the second annular surface 32 (by closing the groove 20) allows to prevent the pressure coming from the upper portion (radially outside the coupling), with reference to the radial axis in FIG. 1, from pushing the sheet-metal 27 radially inwards and air from escaping in the lower portion (radially inside the coupling). The axial lug 24 also allows to contain the sheet-metal 27 in case it is damaged or even broken.

The sheet-metal 27 is made of steel.

With reference to FIG. 6, the first flange 16 also comprises at least one orifice 33 passing through it on either side along an axis B. The axis B of the through orifice is parallel with the longitudinal axis X. The first flange 16 comprises a plurality of orifices 33 distributed regularly around the longitudinal axis X. Each orifice 33 is intended to receive at least partly the attachment device 15. The first flange 16 further comprises at least one counterbore 34 which is coaxial with the through orifice 33. This counterbore 34 is annular. The counterbore 34 opens out into the first surface 18 of the first flange 16.

With reference to FIG. 5, the second flange 17 comprises at least one hole 35 passing through it on either side along the longitudinal axis X. The second flange 17 comprises a plurality of holes 35 distributed regularly around the longitudinal axis X. In particular, each hole 35 opens onto a third surface 36 and a fourth surface 37 which are opposite each other along the longitudinal axis X. An annular projection 38 is arranged on the third surface 36 of the second flange 17. The projection 38 extends in particular axially from the third surface 36 of the second flange 17. A chamfer is defined between the projection 38 and the third surface 36. The latter corresponds to the second support surface 32 on which the second soleplate 29b of the sheet-metal 27 rests. The axis of each through hole 35 is parallel with the longitudinal axis. In this example, the axes of the through-orifice and of the through-hole are coaxial. Each hole 35 is intended to receive at least partly the attachment device 15.

In FIGS. 5 and 6, the attachment device 15 comprises at least one threaded rod 39 having a substantially straight cylindrical body of axis C. Each threaded rod 39 is equipped with an external thread 40 and is intended to engage in the orifices and holes 33, 35 of the first and second flanges 16, 17. The threaded rod 39 comprises a collar 41 which is intended to come in abutment against the third surface 36 of the second flange 17. Advantageously, a counterbore 42 coaxial with the through hole 35 is made in the third surface 36 of the second flange 17. In this case, the collar 41 comes in abutment against the bottom of the counterbore 42. The second support surface 32 extends radially inwards from the counterbores 42 onto the third surface 36. The attachment device 15 further comprises tightening means 43 which are mounted on the threaded rod 39 so as to attach and tighten the first and second flanges 16, 17 against each other.

Advantageously, the threaded rod 39 may be a stud that extends between a first end 44a and a second end 44b. The tightening means 43 may be nuts 45 which each comprise a body with an internal bore. An internal thread is arranged in the internal bore so as to cooperate with the external thread 40 of the threaded rod 39. A first nut 45a has a support surface 45a1 which rests on the second surface 19 of the first flange 16 and a second nut 45b has a support surface 45b1 which rests on the fourth surface 37 of the second flange 17. Alternatively, the threaded rod 39 is in the form of a screw comprising a head at one end and the tightening means 43 comprises a nut 45 mounted on the other (free) end of the screw.

Figure 7:
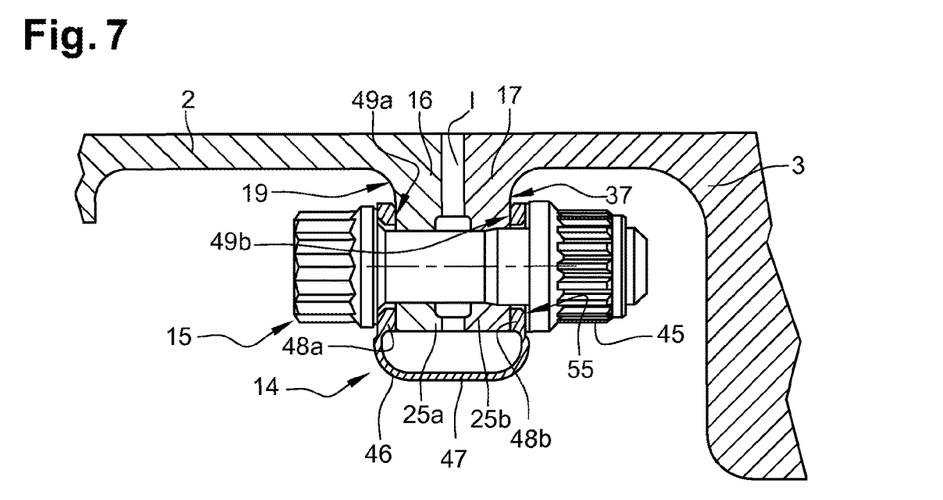
FIG. 7 shows another embodiment of a turbine engine assembly equipped with a sealing device and an attachment device between a first and a second rotor element according to the invention.

FIGS. 7 to 10 show a further embodiment of the sealing device 14 and of the attachment device 15 of the radial flanges 16, 17 of the first and second elements 2, 3. In the following description, the elements which are identical or substantially identical and/or have the same functions as those described above are designated and represented by the same numerical references. In FIG. 7, the first element 2 comprises a first radial flange 16 and the second element 3 comprises a second radial flange 17. The flanges extend radially inwards. The first flange 16 comprises several through orifices 33 and the second flange 17 comprises several through holes 35. The through holes and orifices are coaxial. In the present embodiment, the assembly is equipped with a sealing device 14 held on the flanges and with an attachment device 15 configured to optimally hold the sealing device in position and firmly on the first and second radial flanges 16, 17.

Figure 8:
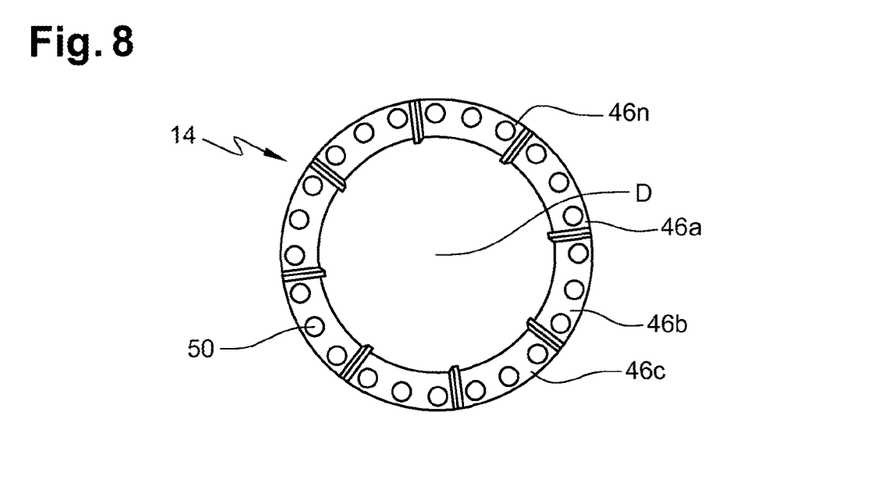
FIG. 8 is a side view of an example of annular sealing member intended to cooperate with radial flanges of rotor elements according to the invention.

In FIGS. 7 and 8 the sealing device 14 comprises an annular shield 46 (360°) mounted at the periphery of the flanges 16, 17. The shield 46 has an axis D coaxial with the longitudinal axis X. The shield 46 has a segment covering at least partly the free ends 25a, 25b of the first and second radial flanges. The shield 46 is generally U-shaped. In particular, the shield 46 comprises a longitudinal segment 47 (forming the bottom of the U) and two branches (referred to as first branch 48a and second branch 48b) extending respectively at one end of the longitudinal segment 47. The two branches 48a, 48b are opposite each other and are each defined in a plane substantially perpendicular to the axis D of the shield 46. The shield 46 comprises annular support areas 49a, 49b intended to be supported against the radial flanges 16, 17.

As can be seen in FIG. 7, the first branch 48a of the shield comprises a first annular bearing area 49a which is supported against the second surface 19 of the first flange 16. Similarly, the second branch 48b of the shield comprises a second annular support area 49b which is supported against the fourth surface 37 of the second flange 17. The support areas or the radial branches have a predetermined radial height. Advantageously, this predetermined radial height is between one third of the height of the radial flanges and the total height of the radial flanges. The shield 46 acts as a cover by covering the radial flanges 16, 17 and thus the possible gap I between the flanges 16, 17.

The sealing device 14 is made of a metallic material. The shield 46 can be made of steel as well as the sheet-metal 27. The branches 48a and 48b of the shield 46 may be flexible to facilitate the placing of the shield 46 around the flanges 16, 17 and their holding also on the flanges 16, 17. In this way, the flowing of the fluid through the flanges 16, 17 and the teeth/complementary teeth 6, 9 of the first and second rotor elements 2, 3 is impeded.

With reference to FIG. 8, each first branch 48a and second branch 48b of the shield comprises a plurality of slits 50 which passes through their walls transversely. The slits 50 are evenly distributed around the axis D of the shield. The slits 50 of the first branch are arranged opposite the slits 50 of the second branch. The threaded rod 39 of the attachment device 15 is intended to pass through the slits 50 of the first and second branches 48a, 48b of the annular shield 46. Here, the slits 50 are circular in shape. These can, of course, have other shapes as long as they allow the passage of a threaded rod.

The tightening means 43 are arranged on either side of the radial flanges 16, 17. Here, the support face 45a1 of the first nut 45 is in contact with a first wall 55 of the first branch. The first wall 55 of the branches is opposite the second wall of the branches which faces the inside of the shield. The second and fourth surfaces 19, 37 define the support areas of the shield 46. In this embodiment, the threaded rod 39 is a screw that comprises a head. The tightening means 43 comprises a nut 45 for mounting on the distal end of the screw.

Figure 9:
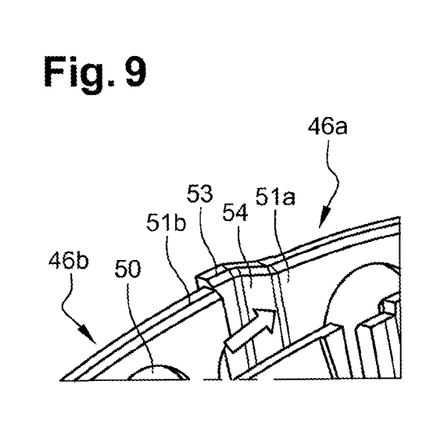
FIG. 9 shows a partial perspective of a first sector of the sealing member intended to cooperate with a second sector of the sealing member.
Figure 10:
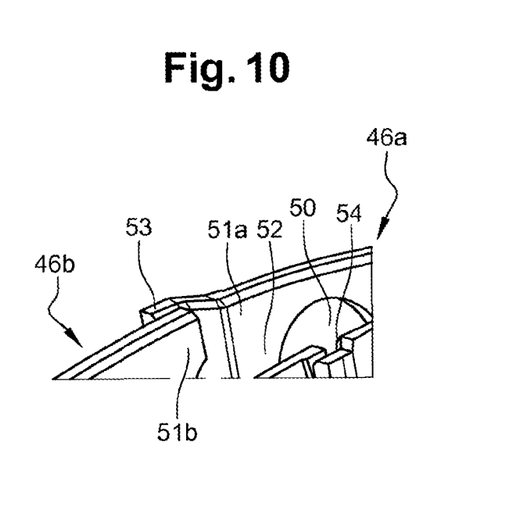
FIG. 10 shows a partial perspective view of the first sector of the sealing member engaged with the second sector of the sealing member according to the invention.

In FIGS. 8 to 10, the shield 46 comprises several annulus sectors 46a, 46b, 46c, 46n. There are eight annulus sectors in this example. Each annulus sector extends along a circumferential length between two circumferential ends (referred to as first circumferential end 51a and second circumferential end 51b). The circumferential ends 51a, 51b delimit openings 52 (or air-gap) opening out into the sector. The circumferential length corresponds to an angular segment between 25° and 50°. Each annulus sector 46a, 46b, 46c, 46n of the shield 46 comprises a generally U-shaped cross-section.

With reference to FIG. 9, each annulus sector nests into an adjacent annulus sector along a circumferential direction. In particular, the first circumferential end 51a of the annulus sector 46a comprises a rim 53 which widens the opening and the wall outwards. The rim 53 extends circumferentially but also transversely. The second end 51b of the adjacent annulus sector 46b is intended to engage within the rim 53 of the annulus sector 46a so that it surrounds it.

Figure 11:
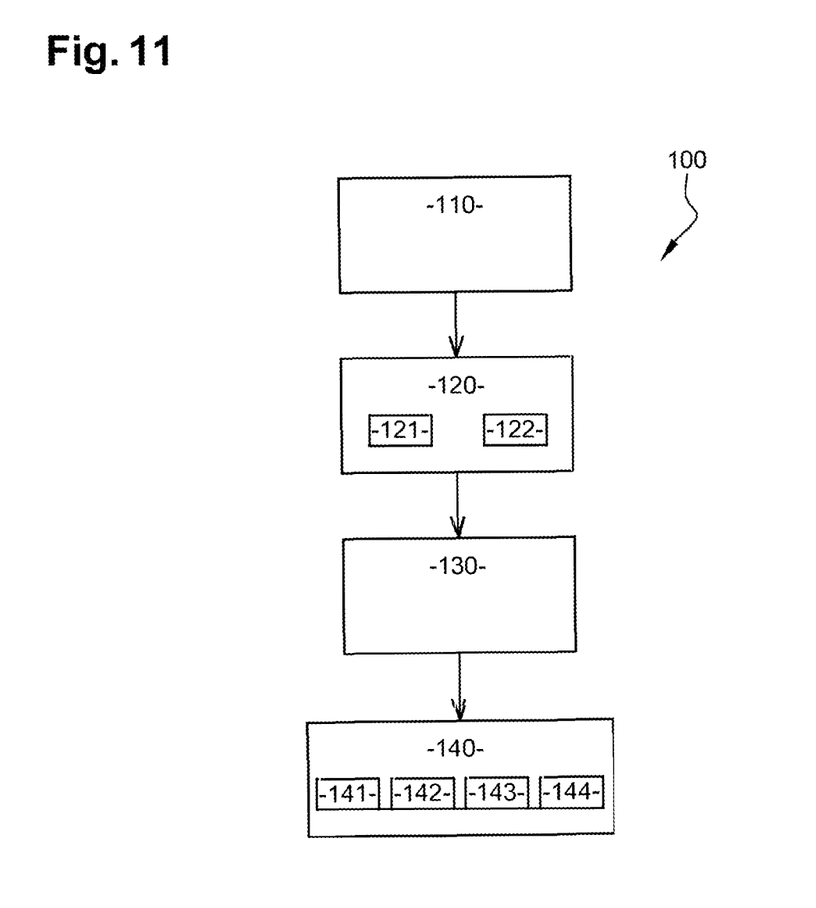
FIG. 11 is an example of flowchart of a method for mounting a sealing and attachment device in the turbine engine assembly according to the invention.

We will now describe a method for mounting the turbine engine assembly as described above. The main steps of the method are shown in FIG. 11. The method comprises the following steps:

a step 110 of providing a sealing device, and
a step 120 of placing the sealing device 14 at the level of the first and second radial flanges 16, 17 to impede a fluid flowing through the toothed coupling.

The method also comprises a step of providing 130 an attachment device 15 and a step 140 of mounting the attachment device 15 to the first and the second radial flanges 16, 17 so as to hold the sealing device 14 and the first and second radial flanges together. The providing step 130 may be carried out simultaneously with step 110 or after step 120.

The sealing device 14 and the attachment device 15 are separate parts. These were previously manufactured by different production methods.

In the embodiment illustrated in FIGS. 2 to 7, the step 120 of placing the sealing device 14 comprises a sub-step 121 of placing the sealing device 14 (the sheet-metal 27) in the groove 20 of the first flange 16. In the case of the sheet-metal 27, once it is in place, its second soleplate 29b is outside the groove 20. The summit 20 is in contact with the first wall 22 of the flange 16, the extreme point of the first soleplate 29a is in contact with the second wall 23 of the flange 16 and a segment of the first soleplate 29a is also supported against the curved support surface 31.

The step 140 of mounting the attachment device 15 comprises a sub-step 141 of inserting the threaded rod 39 into the hole 35 of the second flange 17 as shown in FIG. 5. In this step, the threaded rod 39 (in this case the stud) is inserted into the through hole of the second flange 17 from the third surface 36 and following the arrow F. The rod 39 is inserted until the collar 41 is in abutment against the third surface 36 or the bottom of the counterbore 42. The second end 44b of the stud extends on the side of the surface 37 of the second flange 17. The step 140 also comprises a sub-step 142 of tightening the threaded rod 39 onto the second flange 17. For this purpose, the second nut 45b is screwed onto the external thread 40 of the threaded rod 39, in particular from the second end 44b thereof, until its support face 45b1 rests on the fourth surface 37 of the second flange 17. The threaded rod 39 is made secured to the second flange.

The step 140 comprises a sub-step of inserting 143 the threaded rod 39 mounted on the second flange 17, into the orifice 33 of the first flange 16, so that the second flange faces the groove 20. The threaded rod 39 is inserted on the side of the first surface 18 of the first flange 16. After insertion, the first end 44a of the rod 39 extends from the second surface 19 of the first flange 16, and the third surface 36 of the second flange 17 faces the first surface 18 of the first flange 16.

The step 140 comprises a sub-step 144 of tightening the threaded rod onto at least the first flange 16. For this purpose, the first nut 45a is screwed onto the external thread of the threaded rod and in particular onto the first end 44a of the latter. The first nut 45a is screwed on until its support face 45a1 rests on the second surface 19 of the first flange 16. During the screwing/tightening, the first flange 16 moves towards the second flange 17. In this way, the first and second flanges are secured to each other. Similarly, the second flange 17 closes the groove 20 to trap and crush the sheet-metal 27 within it. In addition, a flat face of the projection 38 abuts against a flat face of the rib 26 to produce a flat support connection. The segment of the second soleplate 29b also rests against the curved support surface 32 of the second flange 17. We can see that the soleplate 29a overlaps radially outwards with the flat support connection between the flanges 16, 17. Similarly, the groove 20 is closed by a flange segment 17a (see FIG. 3), at the free end 25b thereof, which has a height h3 at least equal to the height h2 of the groove 20. The height h3 is measured here between a plane of the face of the free end and a parallel plane through the projection 38. The sealing device 14 and the attachment device 15 are held together firmly on the radial flanges 16, 17.

In the embodiment illustrated in FIGS. 8 to 10, the step 120 of placing the sealing device 14 comprises a sub-step 122 of placing the sealing device 14 around the first and second radial flanges 16, 17 so as to cover at least the free ends 25a, 25b of the radial flanges 16, 17. This sub-step 122 consisting in particular of the engagement or nesting of each second circumferential end 51b of an annulus sector 46a, 46b, 46n of the shield in the widened rim 53 of the first circumferential end 51a of the adjacent annulus sector along the circumferential direction. The second end 51b of each annulus sector slides circumferentially within a rim 53 and then comes in abutment against a bottom wall 54 of the rim 53. The wall or support area of each annulus sector has a continuous surface. In order to mount the last annulus sector of the shield 46, the annulus sectors are (slightly) rotated tangentially so as to further enlarge the vacant space intended to receive the last annulus sector. For this purpose, all the circumferential ends 51a, 51b must abut against the bottom walls 54 of the respective rims 53. Next, the last annulus sector is slid so that its second circumferential end 51b slides within a rim 53 of an adjacent annulus sector and its own rim 53, at its opposite first end, radially overlaps a second circumferential end 51b of another adjacent annulus sector. Then the complete annular shield 46 is arranged around the flanges 16, 17 with their free ends facing the longitudinal segment 47 of the shield 46.

The step 140 of mounting the attachment device 15 comprises a sub-step of inserting the threaded rod into the slits 50, through orifices 33 and hole 35. In this step, the threaded rod (in this case the screw) is inserted into the slit 50 of the second branch 48b from the wall 55. The rod 39 is inserted until the support surface of the screw head is in supported against the external wall 55 of the second branch 48b. After insertion, the distal end of the screw extends from the wall of the first branch of the shield 46.

The step 140 comprises a tightening sub-step of tightening the screw on the flanges. For this purpose, the second nut 45 is screwed onto the external thread of the screw, in particular on the side of the distal end. The second nut is screwed on until its support face 45a1 rests on the external wall 55 of the first branch 48a of the shield. During the screwing/tightening, the support areas 49a, 49b of the shield approach the second and fourth surfaces 19, 37 of the flanges 16, 17 to carry out the sealing. The first and second flanges are also secured to each other. The sealing and attachment devices are held together firmly on the radial flanges.

Alternatively, the step 140 may comprise the sub-steps 141 to 144 for attaching and holding the sealing and attachment devices 14, 15 together on the flanges 16, 17.

The invention claimed is:

1. A turbine engine assembly comprising a first rotor element and a second rotor element which extend about a longitudinal axis X and which are coupled to one another by means of a toothed coupling allowing the torque transmission between the first and second rotor elements, the first rotor element and the second rotor element respectively comprising a first radial flange and a second radial flange which are annular and which are arranged opposite one another,     wherein the first rotor element comprising teeth and the second rotor element comprising complementary teeth, the teeth and complementary teeth extending along the longitudinal axis form the toothed coupling, and in that the assembly comprises a sealing device configured so as to ensure a sealing of the toothed coupling at the level of the first and second flanges.

2. The turbine engine assembly according to claim 1, wherein the turbine engine assembly comprises an attachment device configured so as to hold the sealing device and the first and second flanges firmly together.

3. The turbine engine assembly according to claim 1, wherein the first flange and the second flange each extend radially inwardly of the toothed coupling.

4. The turbine engine assembly according to claim 1, wherein the first flange comprises a groove open to a first surface thereof and the sealing device is intended to be housed at least partly within the groove.

5. The turbine engine assembly according to claim 1, wherein the sealing device comprises an annular corrugated sheet-metal.

6. The turbine engine assembly according to claim 1, wherein the sealing device comprises an annular shield intended to cover at least partly free ends of the first and second flanges.

7. The turbine engine assembly according to claim 6, wherein the shield comprises a general U-shape, the shield comprising a longitudinal segment, a first branch and a second branch.

8. The turbine engine assembly according to claim 6, wherein the shield comprises a plurality of annulus sectors which each extend along a circumferential direction.

9. The turbine engine assembly according to claim 1, wherein the attachment device comprises a threaded rod intended to pass through at least one orifice passing through the first flange and one hole passing through the second flange, the attachment device further comprising tightening means intended to be mounted on the threaded rod so as to make it secured to at least one of the first and second flanges.

10. The turbine engine assembly according to claim 7, wherein the first branch and the second branch comprise a plurality of slits which are intended to be passed through by the threaded rod, the first branch and the second branch comprising bearing areas each resting respectively on a second surface of the first flange and of the second flange.

11. An aircraft turbine engine comprising at least one turbine engine assembly according to claim 1.

12. A method for mounting a turbine engine assembly, said turbine engine assembly comprising a first rotor element and a second rotor element which extend about a longitudinal axis X and which are coupled to one another by means of a toothed coupling allowing the torque transmission between the first and second rotor elements, the first rotor element and the second rotor element respectively comprising a first radial flange and a second radial flange which are annular and which are arranged opposite one another,     wherein the first rotor element comprising teeth and the second rotor element comprising complementary teeth, the teeth and complementary teeth extending along the longitudinal axis form the toothed coupling, and in that the assembly comprises a sealing device configured so as to ensure a sealing of the toothed coupling at the level of the first and second flanges, wherein the method comprises:

a step of providing the sealing device, and a step of placing the sealing device at the level of the first and second radial flanges to impede a fluid circulation through the toothed coupling.

13. The mounting method according to claim 12, wherein the method comprises:

a step of providing the attachment device and a step of mounting the attachment device to the first flange and the second flange so as to hold the sealing device and the first and second flanges firmly together.

14. The mounting method according to claim 12, wherein the sealing device comprises an annular shield intended to cover at least partly free ends of the first and second flanges and the step of placing the sealing device at the level of the first and second flanges comprises a sub-step of placing the sealing device in the groove of the first flange.

15. The mounting method according to claim 12, wherein the sealing device comprises an annular shield intended to cover at least partly free ends of the first and second flanges and the step of placing the sealing device at the level of the first and second flanges comprises a sub-step of placing the sealing device around the first and second radial flanges so as to cover at least the free ends of the first and second flanges.

\* \* \* \* \*